INVENTORS
David W. Turner &
BY Thomas W. Morrow

Thomas N. Young
ATTORNEY

INVENTORS
David W. Turner &
BY Thomas W. Morrow

Thomas N. Young
ATTORNEY

United States Patent Office 3,421,227
Patented Jan. 14, 1969

1

3,421,227
TWO AXIS LEVEL DETECTOR
David W. Turner, Hales Corners, and Thomas W. Morrow, Oak Creek, Wis., assignors to General Motors Corporation, Detroit, Mich., a corporation of Delaware
Filed May 23, 1966, Ser. No. 552,142
U.S. Cl. 33—206   5 Claims
Int. Cl. G01c 9/00

ABSTRACT OF THE DISCLOSURE

A level detector having a mass supported for omnidirectional planar displacement over a support surface by means of a fluid bearing. The displacement in either of two orthogonal directions is sensed by Hall probes mounted between magnets carried by the test mass and the support, and the outputs of the Hall probes control the energization of forcer coils, also mounted between magnets carried by the test mass and the support 5, which tend to retain the test mass in a central null position. Rotation of the test mass relative to the support is restrained by similar forcer coils.

---

This invention relates to level detectors and more particularly to apparatus for simultaneously determining the angularity of a test surface about two angularly spaced horizontal axes.

In testing and calibrating inertial instruments, such as gyros and accelerometers, it is important to know what contributions to the test data are made by small deviations from horizontal in the angular position of the test surface upon which the instrument rests. It is, therefore, desirable to measure this deviation from the horizontal to a high degree of accuracy for correction or compensation purposes.

In accordance with the present invention, the deviation from horizontal of a test surface may be quickly and accurately determined using a single device capable of determining deviation about two horizontal angularly spaced, e.g., orthogonal, axes. This is accomplished by means of a sensing instrument which may be placed on a test surface of unknown angular orientation and which comprises a test mass which is frictionlessly supported from a support surface by means of a fluid bearing. So supported, the test mass is subject to gravitational force components tending to slide the mass along the support surface. The force tending to displace the mass over the support surface is, of course, proportional to the test mass, the acceleration of gravity, and the angle between the support surface and the local horizontal. Knowing the angular relation between the test mass support surface and the surface being examined, the displacement force may be taken as a direct indication of the angular deviation of the surface under examination.

Accordingly, means are provided for determining the displacement force along each of two angularly spaced (preferably orthogonal) horizontal axes. For example, it is suggested in the following description that a force-balance type of system be used wherein displacement of the test mass produces a force counteracting the gravitationally induced displacement force. The energy required to produce a counteracting force which exactly balances the gravitational force may thus be taken as a measurement of the angle of the test surface with respect to the horizontal.

It is to be understood that the terms "horizontal" and "local horizontal" as used herein refer to a plane which is normal to the local vertical as established by the gravity vector.

The invention may be best understood by reference to the following specification in which specific embodiments of the invention are described. This specification is to be taken with the accompanying figures of which:

Figure 1:
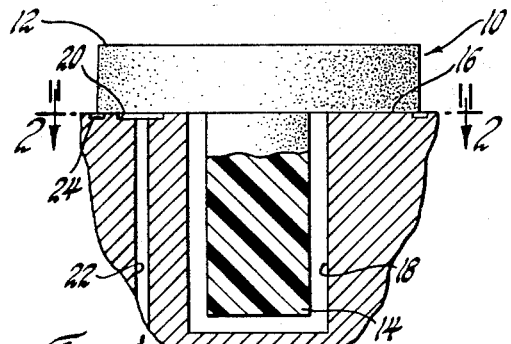
FIGURE 1 is a cross-sectional view of an illustrative fluid bearing test mass combination.

Referring now to FIGURE 1, the combination illustrated therein includes a test mass 10 having an upper cylindrical portion 12 of large diameter and a lower cylindrical portion 14 of reduced diameter. The portions 12 and 14 are integral and coaxial. The lower portion 14 protrudes into but is radially and axially spaced from a cylindrical well 18 formed in a support surface 16.

Figure 2:
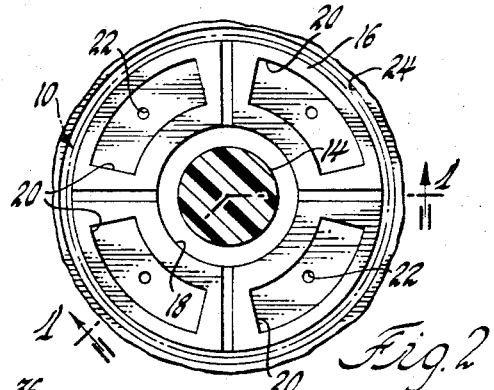
FIGURE 2 is a top view of the combination shown in FIGURE 1.

As best shown in FIGURE 2, the mass 10 is supported free from physical contact with surface 16 by a hydrostatic fluid bearing comprising a plurality of sectorial pockets 20 symmetrically arranged about the center well 18. The sectorial pockets 20 are radially spaced from the center of well 18 so as to lie beneath the laterally extending underside of the upper cylindrical portion 12 of test mass 10. A fluid inlet 22, adapted to receive a fluid such as air or helium under pressure from a source not shown, serves each of the pockets 20. The fluid flowing into each of the pockets 20 moves radially outward toward an annular groove 24 in the surface 16 creating a supporting force which levitates test mass 10 with respect to surface 16.

While the fluid bearing provides vertical support, it does not restrict lateral displacement of the mass 10. The mass 10 may be displaced omnidirectionally parallel to the plane of the support surface 16. Thus, if the arrangement shown in FIGURES 1 and 2 is rested upon a test surface under inspection, and surface 16 assumes the angularity of the test surface, any tendency toward lateral deviation of the test mass 10 is an indication of the non-correspondence of the plane of surface 16 with the local horizontal. Therefore, lateral displacement force upon the test mass 10 may be measured as an indication of the angle between surface 16 and the horizontal.

Test mass 10 is designed such that the mass center thereof lies as nearly as possible in the plane of lateral translation. This eliminates a couple from acting to squeeze or relax the fluid thickness radially across the bearing thus maintaining the test mass substantially parallel to the support surface 16. It will be understood that while a circular arrangement is shown in FIGURES 1 and 2, the test mass 10 and associated air bearings could also be square.

Figure 3:
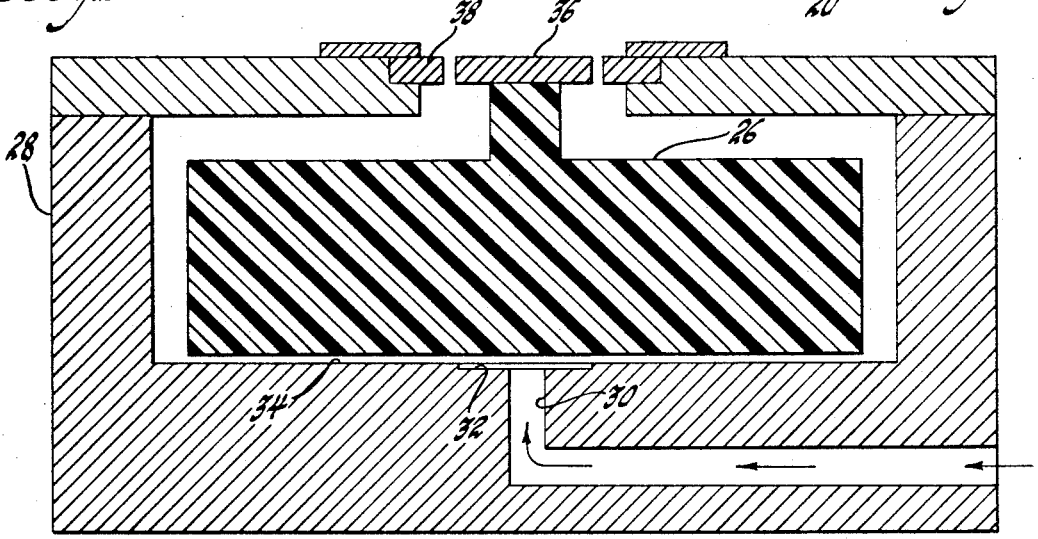
FIGURE 3 is a cross-sectional view of another illustrative test mass fluid bearing combination.
Figure 4:
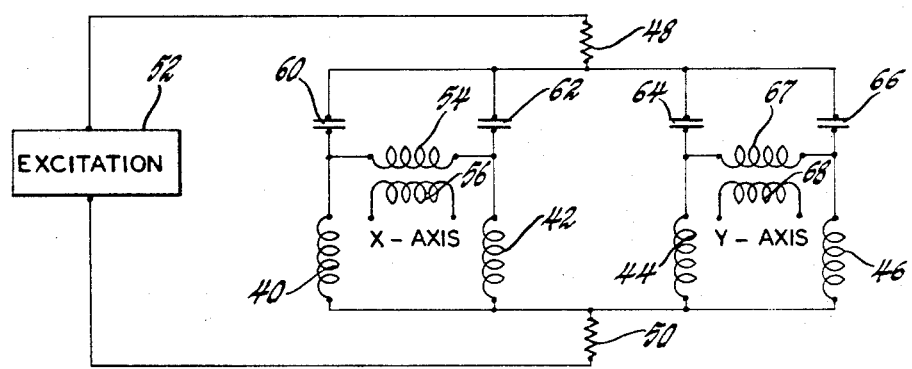
FIGURE 4 is a schematic diagram of a force-balance displacement measuring system which is adapted for combination with the apparatus shown in FIGURE 3.

Referring now to FIGURE 3, a test mass 26 is shown supported within a receptacle 28 by means of an air bearing including an inlet 30 and a central pocket 32. The fluid pressure which is generated by the flow of fluid through inlet 30 and pocket 32 supports the test mass 26 free from a support surface 34 thus allowing lateral freedom to the test mass 26 as was the case in the arrangement of FIGURES 1 and 2. To detect lateral displacement of the test mass 26, a microsyn force generator is shown. The microsyn, which is a well known prior art device, includes a rotor 36 and a surrounding stator 38. As is well known to those skilled in the art, the microsyn combination 36, 38 is an inductive device for producing signals indicative of the lateral displacement of a central rotor with respect to a symmetrical and surrounding arrangement of stator coils. As shown in FIGURE 4, stator 38 comprises four parallel connected coils 40, 42, 44 and 46 connected in series with resistors 48 and 50 across an AC source 52. Coils 40, 42, 44 and 46 are respectively connected in series with working capacitors 60, 62, 64 and 66.

For readout purposes along one axis of the FIGURE 3 device, coil 54 is connected across the upper ends of coils 40 and 42 and is inductively linked with a secondary or output coil 56. A similar arrangement comprising coils 67 and 68 connected across coils 44 and 46 is also provided. As indicated in FIGURE 4, stator coils 40, 42 are oppositely disposed with respect to rotor member 36 to define an X axis from which displacements are measured and coils 44 and 46 are disposed oppositely rotor 36 but 90 degrees away from coils 40 and 42 to define a Y axis. The X and Y axes are nominally horizontal axes along which displacements of test mass 26 are measured.

In operation, the working capacitors 60, 62, 64 and 66 are adjusted equally for half power point operation, and the total current from source 52 is set at a particular level. The inductance of the coils 40, 42, 44 and 46 is a function of the air gap between the stator 38 and the rotor 36, increasing as the air gap decreases. When rotor 36 is in a central position, the impedance of each coil is the same, and the voltages across primary coils 54 and 56 are zero. However, if the rotor 36 is displaced from a central position toward, for example, coil 40, the impedance of winding 40 increases while that of coil 42 decreases. A potential arises across primary winding 54 producing an X axis output across coil 56. Lateral displacements of test mass 26 carrying rotor 36 along the Y axis produce a corresponding action yielding an output signal from coil 58. The mircosyn is inherently a self-adjusting device in which the force of attraction between the rotor and the stator is automatically decreased on the side of the rotor which draws nearer to the stator and automatically increased on the opposite side.

Figure 5:
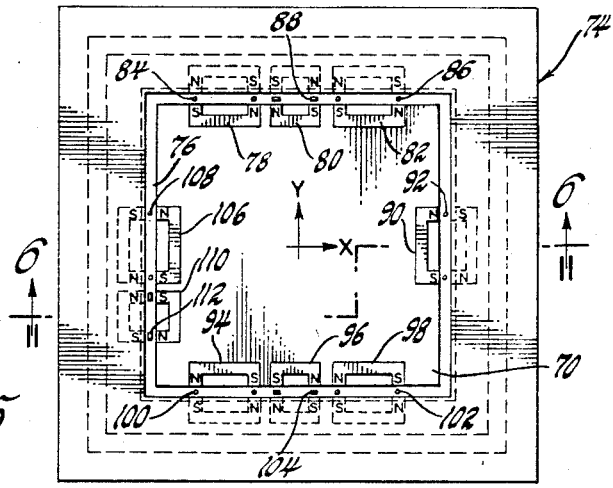
FIGURE 5 is a top view of another embodiment of the invention.
Figure 6:
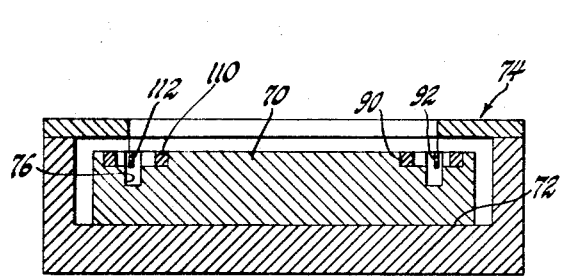
FIGURE 6 is a sectional side view of the embodiment shown in FIGURE 5.

In FIGURE 5, another system is shown for measuring the horizontal displacement of a test mass 70 from a reference position. The test mass 70 as shown in FIGURE 6 is freely supported above a support surface 72 which is defined by the lower portion of an enclosing support assembly 74. The details of the air bearing support for test mass 70 are omitted from FIGURE 6 since the bearing may take the form of those bearings shown in FIGURES 1, 2 or 3. It will be appreciated that the bearing configuration of these figures may be readily adapted to a square test mass such as that shown in FIGURES 5 and 6.

To detect and measure the horizontal angularity of the assembly shown in FIGURES 5 and 6, a closed loop force-balance system is employed. A rectangular channel 76 is formed in the upper surface of test mass 70 in a closed square configuration, as best shown in FIGURE 5. Sets of rectangular split permanent magnets are disposed about the four sides of the square channel 76, as shown in FIGURE 5. On the north side of test mass 70 are disposed three split magnets 78, 80 and 82. Each of the magnets is disposed with the two portions thereof on respective sides of channel 76 so as to produce local magnetic fields across the channel. Fixed forcer coils 84 and 86 are suspended from the upper portion of the support assembly 74 such that at least a portion of each of the coils lies within the local magnetic fields produced across channel 76 by magnets 78 and 82, respectively. Similarly, a Hall effect probe 88 is suspended from the support assembly 74 to lie within the local magnetic fields produced by magnet 80. Coils 84 and 86 and Hall probe 88 are, of course, fixed relative to the support assembly 74 and therefore will move with respect to their associated magnets upon lateral shifting of test mass 70.

As shown in FIGURE 5 and also in the sectional view of FIGURE 6, a torquing coil 92 is suspended from support assembly 74 so as to be disposed within the magnetic field locations produced by magnet 90 which is located on the east side of the FIGURE 5 combination. Similarly, magnets 94, 96 and 98 are arranged along the top side of channel 76 and have respectively associated therewith a fixed coil 100, a Hall probe 104 and another fixed coil 102. Finally, located on the west side of the FIGURE 5 arrangement are split magnets 106 and 110 of which magnet 106 is associated with a torquing coil 108 and magnet 110 is associated with a Hall probe 112.

Figure 7:
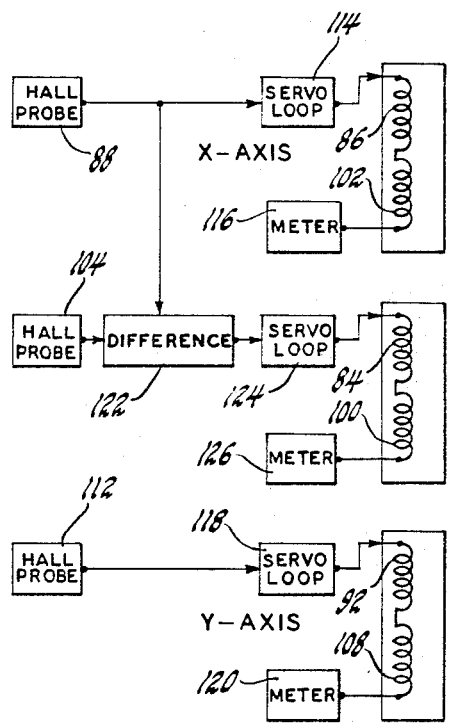
FIGURE 7 is a schematic circuit diagram of the force-balance measuring apparatus to be associated with the FIGURE 6 embodiment.

Referring now to FIGURES 5, 6 and 7, the operation of the closed loop force-balance system shown therein will be described. Assuming the FIGURE 6 assembly is tilted such that the test mass 70 tends to be displaced by gravity toward the left along the X axis, the movable portion of split magnet 80 translates leftward along with the test mass 70 decreasing the field which passes through Hall probe 88. The probe 88 produces an output signal in the well known manner indicating test mass displacement as a function of field strength, and this output signal is connected to a servo loop control 114. This servo control responds to the signal from Hall probe 88 by generating an output signal in the form of current through the series combination of coils 86 and 102. Properly energized with current, forcer coils 86 and 102 produce a field which reacts with the magnetic field of magnets 82 and 98 associated therewith to restrain further translation of the test mass 70 along the X axis. The magnitude of current which is required to balance the test mass 70 against the gravitational displacement force may be indicated by means of a meter 116 which may be calibrated directly in terms of the horizontal deviation of the assembly of FIGURE 6. The displacement sensor and torquing arrangement just described is, of course, bipolar and therefore bidirectional in nature, and may read displacement of the test mass 70 in either direction along the X axis.

Hall probe 112 associated with split magnet 110 operates in a similar fashion for the detection of displacement along the Y axis as shown in FIGURE 5. The output signals from probe 112 are connected through a servo loop control 118 to torquing coils 92 and 108 which are associated with split magnets 90 and 106, respectively. Servo loop control 118 produces current through the series combination of coils 92 and 108 and the magnitude of this current is determined by means of a horizontal deviation calibrated meter 120.

In a two axis level detector of the type described above, it is necessary to restrain rotational motion of the test mass 70 while permitting pure lateral translation. This rotational motion is restrained by means of a detection and force-balance combination in much the same fashion as lateral deviations are detected and restrained. To this end, the outputs of Hall probes 88 and 104 which lie opposite one another as shown in FIGURE 5 are compared at 122 and the difference, if any, between the output signals is fed to a rotational restraining servo loop control 124. The output of control 124 is a current which is conducted through the series combination of coils 84 and 100, and, if desired, may be read by means of a properly calibrated meter 126. It can be seen that any rotational displacement of test mass 70 affects both Hall cells 88 and 104 but in opposite senses and therefore the difference signal from 122 is an indication of such rotation.

Various means for sensing and counteracting the gravitationally induced displacements of the test mass 70 may be used as will occur to those skilled in the art. As an example, a combination electromagnet-permanent magnet system such as that shown in FIGURE 8 may be used. In this configuration, the test mass 128 is suspended above a support surface by means of an air bearing as previously described. The test mass 128 is laterally spaced from the surrounding support structure 130 as indicated by the surrounding gap 132. On each of the four sides of the test mass 128 there is located a U-shaped permanent magnet such as indicated at 134. Directly across from each of these U-shaped permanent magnets is a correspondingly U-shaped electromagnet 136. Permanent magnet 134 and electromagnet 136 are disposed such that like poles are facing, thereby producing repulsion forces directly proportional to the product of the respective pole strengths and inversely proportional to the square of the distance between them.

Figure 8:
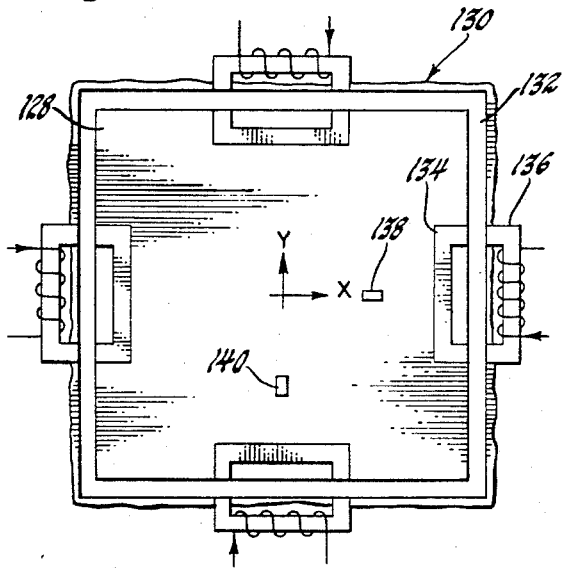
FIGURE 8 is a top view of still another embodiment of the invention.

In the operation of a system such as that suggested in FIGURE 8, suitable X and Y position transducers 138 and 140, respectively, which may, for example, be linear differential transformers, produce signals indicating the degree of displacement of the test mass 128 with respect to a centralized null position. One set of the permanent magnet and electromagnet sets or combinations may be operated open loop and excited to a predetermined level to give a continuous repulsion stiffness and a particular operating on the magnetic hysteresis curves. For example, one permanent magnet-electromagnet combination associated with each of the X and Y axes may be operated open loop. The other permanent magnet-electromagnet combination associated with each of the X and Y axes may be operated in a closed servo loop for measuring the displacement force exerted by gravity upon the block due to a nonlevel condition. The closed loop path would include means for feeding one or the other of the electromagnets with a current just sufficient to return the test mass 128 to the centralized null position. This quantity of current can be determined by means of an ammeter such as is described in FIGURE 7.

It should be pointed out that the system shown in FIGURE 8 is self-stablizing and tends to prevent any rotational motion of the test mass 128 which prevention is necessary in the operation of a two axis device. Any rotational motion would tend to bring two pole faces closer together and thus produce a greater force of repulsion tending to restore the null position to the test mass 128.

Still other means may be employed to accomplish the means of the present invention. For example, the permanent magnet-electromagnet combination shown in FIGURE 8 may be replaced with parallel conductors of which the movable conductors mounted on the test mass 128 might be supplied with constant current, and the fixed conductors mounted on the support assembly might be supplied with varying current as is necessary to produce parallel magnetic fields which tend to maintain the test mass 128 in a null or centralized position.

The foregoing descriptions are intended as illustrative rather than definitive of the invention and are not to be construed in a limiting sense. For a definition of the invention reference should be had to the appended claims.

We claim:
1. Apparatus to be associated with a surface under inspection to determine the horizontality thereof comprising housing means defining a substantially planar support surface portion which parallels the surface under inspection when said apparatus is in use, a test mass having a substantially planar surface portion, hydrostatic fluid bearing means in said housing means for producing pressurized fluid between sai dsurface portions thereby to substantially frictionlessly support the mass relative to the support surface portion for free omnidirectional displacement thereover, and first and second means for determining gravitational force components tending to displace the mass along first an dsecond mutually orthogonal axes, respectively, parallel to the support surface portion.

2. Apparatus as defined in claim 1 wherein each of said first and second means comprises a closed loop force-balance system including means for detecting displacement of the mass along an axis as defined above and forcer means for producing counter-acting forces tending to maintain the mass in a reference position.

3. Apparatus as defined in claim 2 further including means for restraining rotational motion of the test mass with respect to the support surface.

4. Apparatus as defined in claim 2 wherein the force-balance system comprises a plurality of local field generating means disposed on the test mass, at least two Hall effect devices operatively associated with the support surface and disposed within respective fields for producing output signals corresponding to the displacement of the test mass along two orthogonal axes, at least two torquing coils operatively associated with the support surface and disposed in respective fields for producing restraining forces on the test mass, and control means operatively connecting the Hall effect devices with the torquing coils.

5. Apparatus as defined in claim 4 including means for restraining rotational motion of the test mass with respect to the support surface.

References Cited

UNITED STATES PATENTS

| | | | |
|---|---|---|---|
| 2,647,323 | 8/1953 | Johnson et al. | 33—141.5 |
| 2,780,753 | 2/1957 | Mayes | 33—141.5 XR |
| 2,926,530 | 3/1960 | Mueller | 33—206.5 XR |
| 2,987,669 | 6/1961 | Kallman | 324—45 |
| 3,241,245 | 3/1966 | Levine | 33—215.3 |

FOREIGN PATENTS 1,160,199  1963  Germany.

LEONARD FORMAN, *Primary Examiner.*

L. ANDERSON, *Assistant Examiner.*

U.S. Cl. X.R.

324—45